(No Model.)

D. D. WEISELL.
NUT LOCK.

No. 527,569. Patented Oct. 16, 1894.

WITNESSES:
E. E. Coolican.
C. T. Bell.

David D. Weisell INVENTOR

BY
H. C. Hartman
ATTORNEY.

THE NORRIS PETERS CO., PHOTO-LITHO., WASHINGTON, D. C.

UNITED STATES PATENT OFFICE.

DAVID D. WEISELL, OF FORT WAYNE, INDIANA.

NUT-LOCK.

SPECIFICATION forming part of Letters Patent No. 527,569, dated October 16, 1894.

Application filed September 11, 1893. Serial No. 485,234. (No model.)

*To all whom it may concern:*

Be it known that I, DAVID D. WEISELL, a citizen of the United States, residing at Fort Wayne, in the county of Allen, in the State of Indiana, have invented certain new and useful Improvements in Nut-Locks; and I do hereby declare that the following is a full, clear, and exact description of the invention, which will enable others skilled in the art to which it appertains to make and use the same, reference being had to the accompanying drawings, which form part of this specification.

My invention relates to nut locks for bolts, the object of which is to provide a simple, inexpensive, and practical means to prevent nuts from turning off the bolts while in use, from any cause that would effect such displacement; and it consists essentially in the nut having its inner surface chamfered out or expanded at its distal end, in such manner that when in position on the bolt, it forms a triangular space between said chamfered surface and the groove between the threads of the bolt, for the reception of a detent or locking piece to jam the nut.

Figure 1:
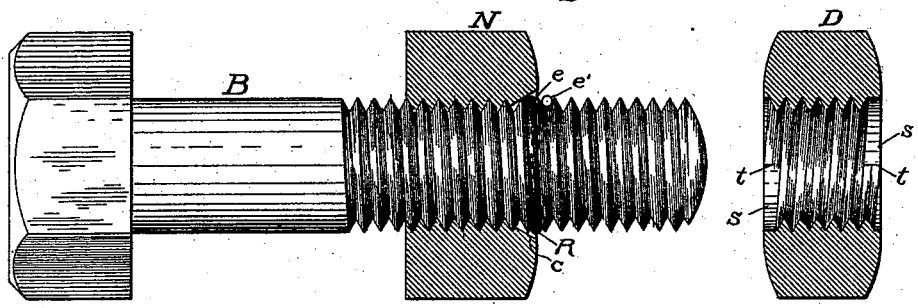
Figure 2:
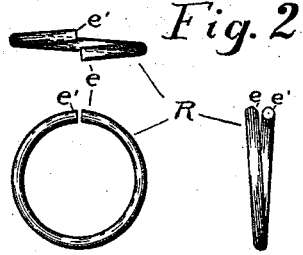
Figure 3:
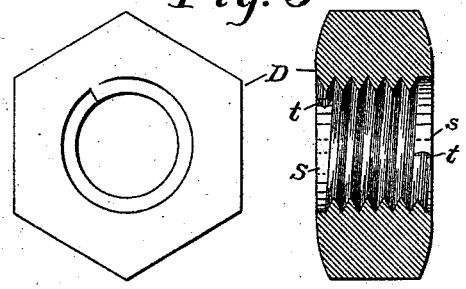
Figure 4:
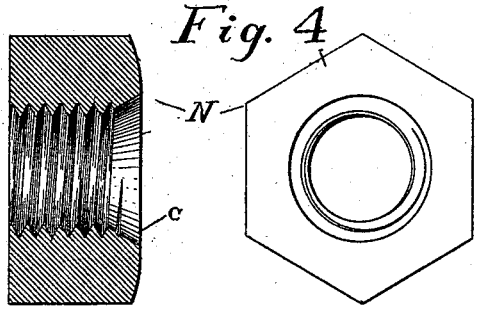

In the drawings, Figure 1 is an assembled view of my entire device showing the nut and preferred form of locking piece in working position on the bolt, and the driver detached therefrom. Fig. 2 is a detail of my preferred form of detent or locking piece. Fig. 3 is a detail of the driver; and Fig. 4 is a detail of the chamfered nut.

Similar letters of reference refer to similar parts throughout the several views.

In the manufacture the bolt is formed and threaded in the usual manner. The nut n, Figs. 1 to 4, is chamfered or expanded at its distal end, preferably by shaping the punch or die that forms the opening through the nut, in such manner as to give the chamfer c the desired size and angle. The nut is then threaded in the usual manner; or the nut may be made and threaded in the usual way, and the chamfer c formed by cutting or reaming out the thread at the distal end. When the nut n is screwed on the bolt, this chamfer c forms a triangular space between its surface and the groove between the threads of the bolt, for the reception of a detent or locking piece R for jamming the nut; but for simplicity, cheapness of construction and practicability, I prefer for a detent or locking piece a coil of wire R, Figs. 1 and 2, of sufficient size and diameter to clasp the bolt firmly in the groove between the threads thereof, and enter under the chamfer in the distal end of the nut.

The following mode of construction is recommended: Coil the wire in the form of a spiral, and cut into rings or coils, leaving the ends square or untapered.

Any suitable means may be used to drive the locking piece in position, but I prefer a driver D, Figs. 1 and 2, made of one of the nuts ordinarily used on the bolts employed, fitted loosely and as follows: At one or both ends of the nut, one or more rounds of the thread are entirely removed, leaving the end t of the remaining thread cut square, as shown in the drawings, Figs. 1 and 3. The surface from which the thread has been removed forms a short sleeve s in the end of the driver, which incloses the rear end of the ring or detent R, and prevents it from springing out of place, when the square end t of the thread of the driver engages the end e' of the ring or detent R with sufficient force to drive the projecting end thereof under the chamfer in the distal end of the nut, with sufficient firmness to lock said nut in position on the bolt.

The application of the device to its intended use is obvious from the description, and is as follows: The nut is screwed firmly in position on the bolt. The coil of wire R is then started in the groove between the threads on the projecting ends of the bolt. The driver D is then placed on the end of the bolt in such manner that the short sleeve S incloses one end of the coil of wire R, and the square end t of the thread of the driver engages the square end e' of the coil R. They are then screwed down on the bolt until the projecting end e of the coil engages under the chamfer in the distal end of the nut. A wrench is then applied to the driver, and the front end e of the coil R is forced tightly under the inclined surface of the chamfer c of the nut, thereby locking said nut firmly upon the bolt. The driver is then removed for further use.

Any undue force that would tend to turn the nut off the bolt, would by reason of the travel of the thread, carry the nut backward, causing the incline of the chamfered surface to ride over and upon the locking piece, with a gradually increased tightening effect, until further movement, without destroying the thread, would be impossible.

The locking piece R lying in the groove between the threads of the bolt, as described, is impinged by the thread its entire length on either side, or by two surfaces of contact, while the chamfered surface of the nut impinges it on the top or by only one surface of contact, wherefore the double frictional contact of the locking piece R within the groove of the bolt, prevents it from turning on the bolt, while, with its single frictional contact, the inclined smooth chamfered surface c of the nut N, by reason of such lesser friction, slides over and up on the locking piece R, until further movement, without destruction of the thread, is impossible.

To remove the nut apply the wrench and force it slightly forward. This relieves the pressure on the locking piece. With a pointed instrument raise the projecting end of the locking piece, seize it with a pair of pliers and pull it out of position. The nut can then be screwed off in the usual manner.

I am aware of Patent No. 378,563 of February 28, 1888, in which the locking device consists of a spiral band tapered at one end, so as to enter a space between the thread of the nut and the thread of the bolt, formed by a practically loose or illy fitted nut; but such is not my construction, nor do I claim anything therein shown.

What I claim as new, and desire to secure by Letters Patent, is—

In a nut lock, the combination with the bolt, of a nut chamfered at its distal end, and a locking piece consisting of a coil of wire adapted to engage the groove of the bolt and be forced under and engage the chamfered surface of the nut, substantially as described.

In testimony whereof I hereunto subscribe my name, in the presence of two witnesses, this 8th day of September, A. D. 1893.

DAVID D. WEISELL.

Witnesses:
HUGH HARTMAN,
H. C. HARTMAN.